(12) United States Patent
Stergioulas et al.

(10) Patent No.: US 11,248,618 B1
(45) Date of Patent: Feb. 15, 2022

(54) O-RING FOR SIDE CHANNEL BLOWER AND SIDE CHANNEL BLOWER INCLUDING SAID O-RING

(71) Applicant: Eagletree-Pump Acquisition Corp., New York, NY (US)

(72) Inventors: Thomas Stergioulas, Hackettstown, NJ (US); Raphael Sagher, Alpine, NJ (US)

(73) Assignee: AIRTECH GROUP, INC., Rutherford, NJ (US)

( * ) Notice: Subject to any disclaimer, the term of this patent is extended or adjusted under 35 U.S.C. 154(b) by 0 days.

(21) Appl. No.: 16/351,624

(22) Filed: Mar. 13, 2019

(51) Int. Cl.
| | | |
|---|---|---|
| *F04D 29/08* | (2006.01) | |
| *F16J 15/02* | (2006.01) | |
| *F04D 23/00* | (2006.01) | |
| *F04D 29/42* | (2006.01) | |

(52) U.S. Cl.
CPC ......... *F04D 29/083* (2013.01); *F04D 23/008* (2013.01); *F16J 15/022* (2013.01); *F04D 29/4226* (2013.01)

(58) Field of Classification Search
CPC .... F04D 29/083; F04D 29/08; F04D 29/4226; F04D 23/008; F16J 15/002; F16J 15/02; F16J 15/0818; F16J 15/32; F16J 15/3216; F16J 2015/0868
See application file for complete search history.

(56) References Cited

U.S. PATENT DOCUMENTS

| | | | | |
|---|---|---|---|---|
| 7,193,491 | B2* | 3/2007 | Leadley-Brown | H01P 1/042 |
| | | | | 277/603 |
| 9,640,853 | B2* | 5/2017 | Chong | H01Q 1/00 |
| 9,843,087 | B2* | 12/2017 | Chong | F16J 15/32 |
| 2020/0032812 | A1* | 1/2020 | Oakman | F04D 29/441 |

FOREIGN PATENT DOCUMENTS

| | | | | |
|---|---|---|---|---|
| WO | WO-2010052082 A1 * | 5/2010 | | F04D 23/008 |
| WO | WO-2017144129 A1 * | 8/2017 | | F16J 15/102 |

OTHER PUBLICATIONS

Translation of WO 2010052082A1; Roesgen, Thomas; Translation courtesy of espacenet.com; Document Date: 2010.*

* cited by examiner

*Primary Examiner* — Courtney D Heinle
*Assistant Examiner* — Danielle M. Christensen
(74) *Attorney, Agent, or Firm* — Thomas M. Galgano; Galgano IP Law PLLC (57) ABSTRACT

An O-ring and a side channel blower employing an O-ring for providing a gap-free, air-tight seal of the blower channel and side-by-side pressure and vacuum ports. The O-ring includes a generally circular, main O-ring have two free ends for sealing a majority of the blower impeller channel, and two relatively smaller O-rings, each of which is attached to an opposite one of the free ends of the main O-ring and are spaced apart in a side-by-side manner and are connected to one another by a bridge member. The small O-rings are configured and dimensioned so that one of the small O-rings serves to seal the vacuum port of the blower and that the other of the small O-rings serves to seal the pressure port of the blower, with the two small O-rings and bridge member and free ends of the main O-ring arranged to create a generally spectacle-like shape.

4 Claims, 6 Drawing Sheets

O-RING FOR SIDE CHANNEL BLOWER AND SIDE CHANNEL BLOWER INCLUDING SAID O-RING

BACKGROUND OF THE INVENTION

1. Field of the Invention

The invention relates to an O-ring with a shape adapted to the configuration of the housing or casing elements of a side channel blower and a side channel blower employing the O-ring. More particularly, it relates to a spectacle-shaped O-ring used to seal the channel of a side channel blower, as well as the peripheries of its vacuum and pressure ports to avoid leakage, from between the casing elements where they are joined together, into the environment, thus providing an air tight seal between the components after assembly. The shape of the O-ring offers sealing protection on the outside edges of the casing elements eliminating any discontinuity or interruption, i.e., gaps in the sealing ring or the vacuum and pressure port openings. To provide constant sealing, the O-ring is comprised of three closed rings, i.e., one relatively large and two relatively small O-rings. The larger main O-ring is intended to surround and encompass the blower channel, while the two smaller O-rings each encircle one of the vacuum and pressure port openings. The three rings are joined together to form one large, unitary ring without any interruptions or gaps. The three rings are joined in a manner such that a section of this unitary ring has an eyeglass frame or spectacle-like configuration or shape.

2. Description of Related Art

Vacuum pumps and, in particular, regenerative blowers are well known and widely used for vacuum and compressed air systems used in a wide range of industries such as the medical and dental, environmental, food and beverage, packaging, chemical and remediation industries, among others (see, e.g., www.airtechusa.com). Regenerative blowers can be used as either vacuum pumps or compressors. For example, regenerative blowers are used for dental compressed air and vacuum systems such as used, e.g., in dental chairs to provide vacuum or suction or, conversely, compressed air to operate dental tools and devices. Regenerative blowers are dynamic compression devices and they utilize a non-contacting impeller to accelerate gas, e.g., air in a specially designed housing to compress the gas and/or create a vacuum. The blowers have a pump inlet which serves as a vacuum connection to which a suction pipe of the system or installation to which it is to be connected (e.g., dental chair) and a pump outlet for a pressure operation to which a pressure pipe of the installation would be connected.

Typically, regenerative blowers comprise a split main housing or casing between which an impeller supported by a drive shaft is rotatably mounted so as to rotate around the axial axis of the unit, and it may contain a "side channel" containing the vacuum and pressure ports, in which case the blowers are commonly referred to as "side channel blowers". The blower via the impeller moves the intake gas radially inside the channel from its vacuum port to its pressure port. The channel and rotating parts are sealed inside and between the split casings which are assembled to encompass the fluid and reduce leakage. The casing housing elements also feature vacuum and pressure ports through which the fluid circulates. The plane of the inlet and outlet for the pressure and vacuum ports can be parallel to or aligned with the rotational plane of the impeller and, in other instances, can be perpendicular to it. As the side channel blower is running, the fluid should ideally be confined while flowing through the side channel without any leaks for a better efficiency. This is usually accomplished with O-rings.

O-ring seals are commonly used as a barrier to create a sealed connection between components. They are particularly used in fluid-conveying systems which require a sealed coupled junction. Likewise, blower and pump designs require a tight seal to prevent fluid leaks and to increase the blower/pump efficiency. The seals can vary in shape but are most commonly ring shaped with a circular cross-section when in a free, unstressed state. The most common and effective material for such O-ring seals is rubber or elastomers. However, other materials can also be used for seals in corrosive or extreme temperature environments.

However, the sealing capacity and assembly of a simply ring-shaped O-ring is limited especially when dealing with complex shape applications. As a result, the installation may not afford an adequate seal and can cause an increased risk of fluid leakage. In other cases, the shape of the blower sealing surfaces would have to be adapted to that of the O-ring to afford an optimal design. With standard O-rings, the sealing of the channel and the ports would then be typically handled independently of one another and there would therefore be discontinuities or gaps in the sealing arrangement of the blower's split housing or casing. Similarly, in embodiments where the axis of the pressure and vacuum ports are disposed parallel to the impeller's rotational plane, it is not possible to seal the full perimeter of the casing with only one O-ring and the use of several O-rings would leave gaps or discontinuities in the seal which would permit leakage.

It is therefore an object of the present invention to provide a novel, unitary O-ring arrangement for a side channel blower having a unique shape and size adapted to the surfaces to be sealed so as to avoid any sealing gaps.

It is a further object of the present invention to produce a side channel blower with reduced leakage and higher efficiency, by employing a unitary O-ring that performs continuous sealing of side channel blowers of the type comprised of two casing elements which encompass a blower cavity that must be sealed together with an inlet port and an outlet port at an axial offset to the blower cavity.

It is also an object of the present invention is to provide an O-ring structure capable of being confined between two connected parts for use with fluids under high temperature and pressure conditions.

It is yet a more particular object of the present invention to provide a simpler and straightforward, yet unique design of an unitary O-ring seal for complex applications wherein the unitary O-ring has a section having an eyeglass frame or spectacle-like configuration or shape which is intended to surround and seal the inlet and outlet ports of the side channel blower.

SUMMARY OF THE INVENTION

Certain of the foregoing objects of the invention are readily-attained according to the present invention by the provision of an O-ring for providing an air-tight seal of the blower channel and side-by-side pressure and vacuum parts of a side channel blower, comprising a generally circular, main O-ring having two free ends for sealing a majority of the blower impeller channel, and two relatively smaller O-rings, each of which is attached to an opposite one of said free ends of said main O-ring and are spaced apart from one another in a side-by-side manner and are connected to one another by an O-ring bridge member. The small O-rings are configured and dimensioned so that one of said small O-rings serves to seal the vacuum port of the side channel blower and that the other of said small O-rings serves to seal the pressure port of the side channel blower, with said two small O-rings and O-ring bridge member and free ends of said main O-ring arranged to create a generally spectacle-like shape.

Preferably, a majority of the main O-ring has a generally annular shape and a minority thereof defined generally by said two free ends thereof extend generally outwardly from said annular main O-ring. Desirably, said smaller O-rings are disposed generally perpendicular to said main O-ring. Advantageously, said O-ring is made of a deformable resilient material so that it can adapt to the shape of the surfaces which are to be sealed. The resilient material is preferably a member selected from the group consisting of rubber, synthetic rubber and an elastomer such as FKM. In a preferred embodiment of the invention, the smaller O-rings are disposed in a spaced-apart side-by-side manner and the bridge member is generally U-shaped. Most desirably, the main O-ring and said two smaller O-rings are formed as one unitary piece.

Certain of the foregoing objects of the invention are also achieved according to the present invention by the provision of a side channel blower of the type consisting of a rotatable impeller received in a generally circular channel defined by two casing members which also define side-by-side vacuum and pressure ports, which includes a generally circular, main O-ring having two free ends for sealing a majority of the blower impeller channel, and two relatively smaller O-rings, each of which is attached to an opposite one of said free ends of said main O-ring and are spaced apart from one another in a side-by-side manner. The two smaller O-rings are connected to one another by an O-ring bridge segment and are configured, dimensioned and disposed so that one of said small O-rings serves to seal the vacuum port of the side channel blower and that the other of said small O-rings serves to seal the pressure port of the side channel blower, with said two small O-rings and O-ring bridge member and free ends of said main O-ring arranged to create a generally spectacle-like shape. The other preferred features of the O-rings as described previously may be advantageously employed in this side channel blower as well.

BRIEF DESCRIPTION OF THE DRAWINGS

Other objects and features of the present invention will become apparent from the detailed description considered in connection with the accompanying drawings, which disclose a preferred embodiment of the invention. It is to be understood that the drawings are to be used for the purpose of illustration only and not as a definition of the limits of the invention.

DETAILED DESCRIPTION OF THE PREFERRED AND ILLUSTRATED EMBODIMENT

Referring now in detail to the drawings and in particular, FIGS. 1-10, therein illustrated is a side channel blower generally designated 10 and an O-ring 11 embodying the present invention. The side channel blower 10 includes an annular or circular impeller 14 which is enclosed at the center of two split casing or housings 12 and 16 (FIGS. 7-9) and is rotatable about the axial axis 18 (FIG. 8) that is located at the center of the shaft bore 20. A motor (not shown) located on the side of the inner casing element 12, rotates the impeller 14 through a drive shaft (not shown). As seen best in FIG. 1, the impeller 14 comprises a hub 22 on which a multiplicity of spaced-apart blades 24 are distributed equally around the circumference thereof. During operation, the blades 24 carries the air in the channel 26 from the vacuum port 28 to the pressure port 30. Thus, the efficiency of the blower 10 depends on the quality of the sealing of the channel 26. As seen best in FIG. 2, an O-ring assembly of the present invention generally designated 11 is installed at the outer perimeter edge 32 of the casing elements 12, 16, in between the blower's channel 26 and the external surface 34 The purpose of the O-ring 11 is to seal the blower's channel 26 around its outer circumference to isolate it from the surrounding environment. The continuity of its shape throughout the casing elements and the openings of the channel allows an uninterrupted seal at the surfaces' junction without any gap.

Figure 1:
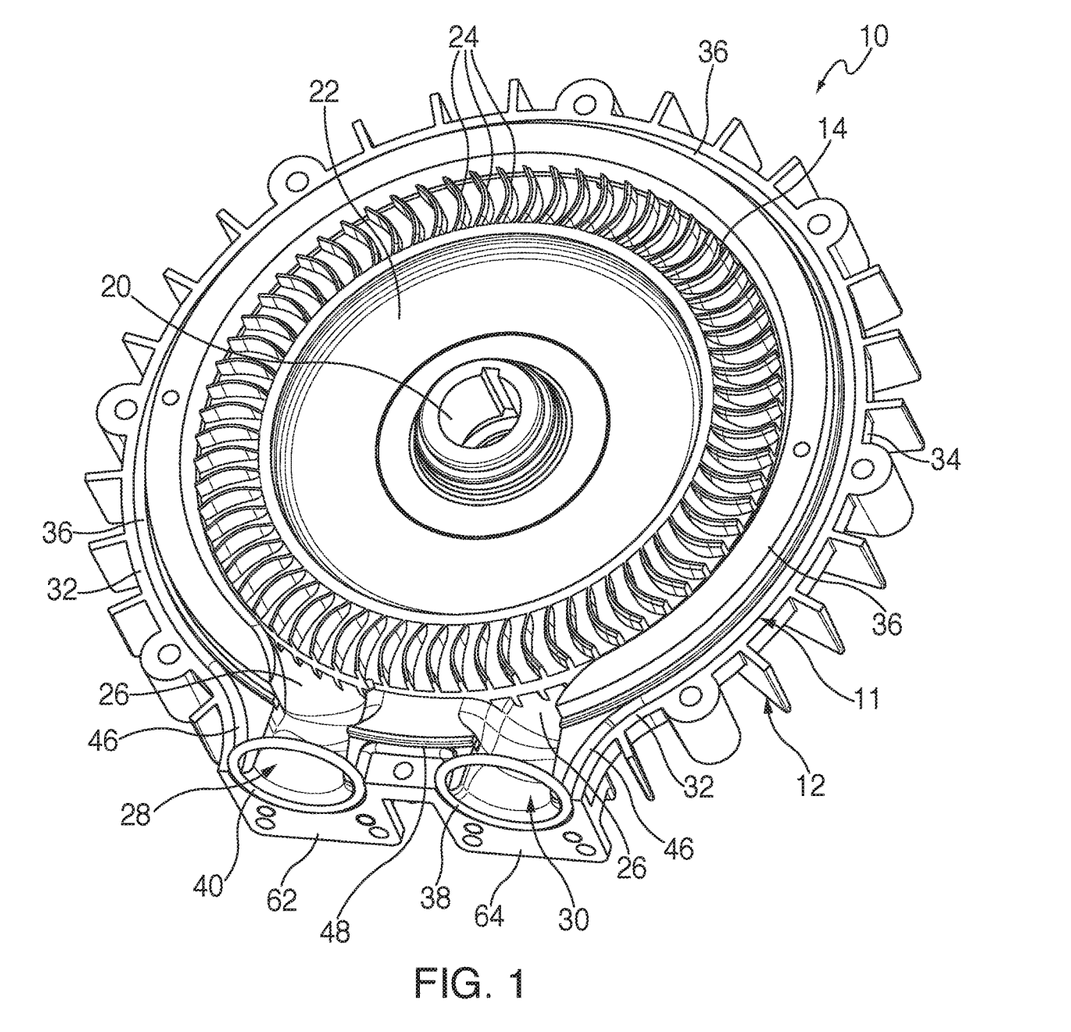
FIG. 1 is top, front and side perspective view of the side channel blower lower housing casing illustrating the O-ring assembly embodying the present invention, arranged therein.
Figure 2:
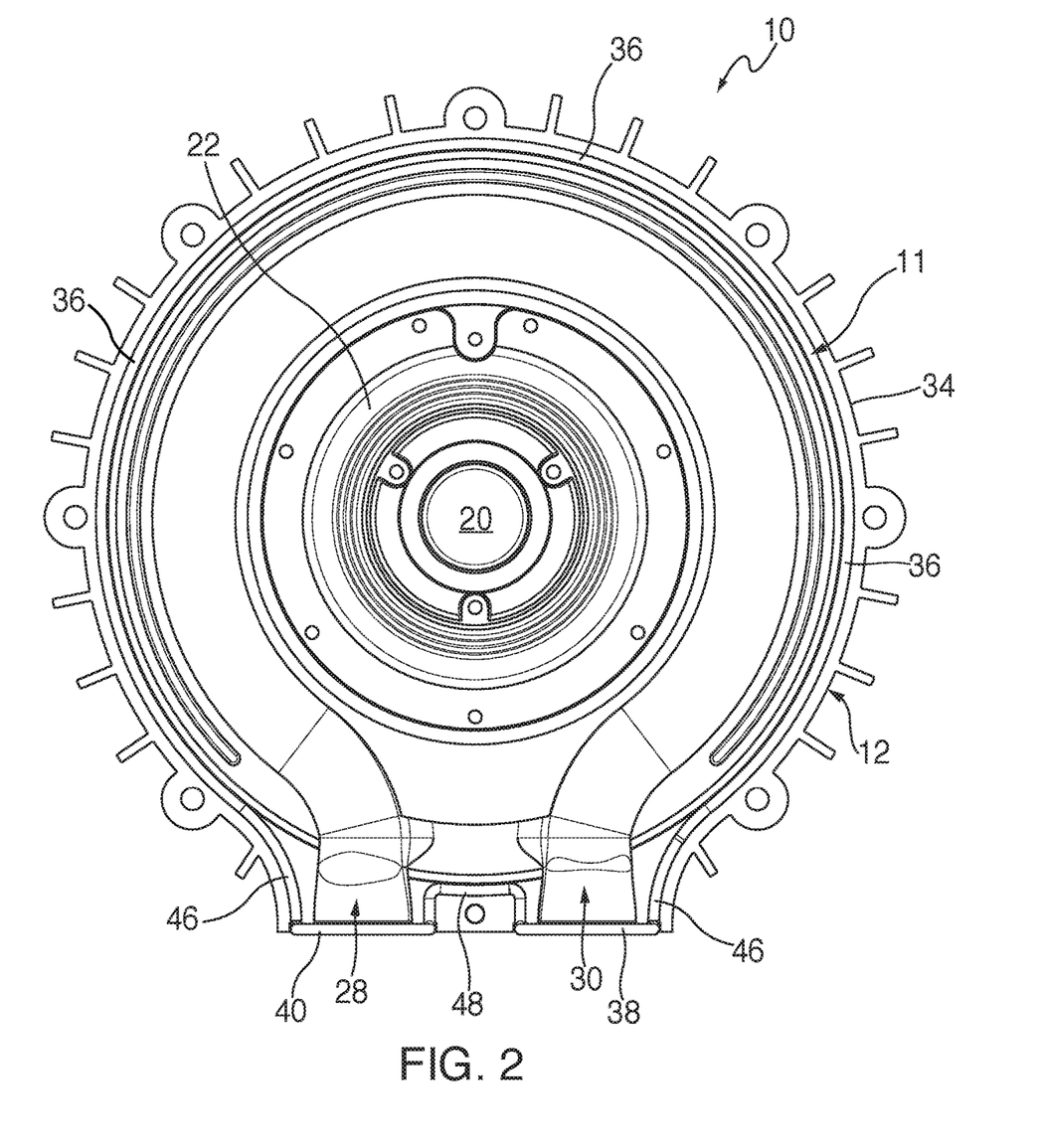
FIG. 2 is a top plan view of the side channel blower lower housing casing shown in FIG. 1.

The sealing of the outer perimeter of the blower 10 is best shown in both FIGS. 1 and 2, with further details highlighted in FIGS. 9 and 10, FIGS. 1 and 2 show a general installation of the O-ring 11 at the outer perimeter of the channel 26 and around the vacuum/pressure ports 28, 30. As seen best in FIGS. 3-6, the shape of the O-ring 11 is defined by three different rings or ring segments 36, 38, 40. The larger main ring 36 encircles the blower cavity or channel 26 and has a slightly smaller diameter than the casing element 12. It is installed in a rectangular groove 42 which is located along the circumference of the channel 26 and which extends radially about axial axis 18. The main O-ring 36 is restrained axially as it is compressed between the inner surface of the inner casing 12 and the outer casing 16. The main ring or O-ring 36 has a material diameter which is slightly larger than the depth 58 of the groove 42, and thus causes flattening of its circular shape as the casing elements 12, 16 are assembled together to provide constant compression and physical contact therewith. The main O-ring 36 is attached to the two other smaller and preferably identical O-rings 38, 40 which are disposed perpendicular to the axial axis of main ring 36 and are disposed so that they are radially arranged and encircle the vacuum and pressure ports 28, 30.

Figure 4:
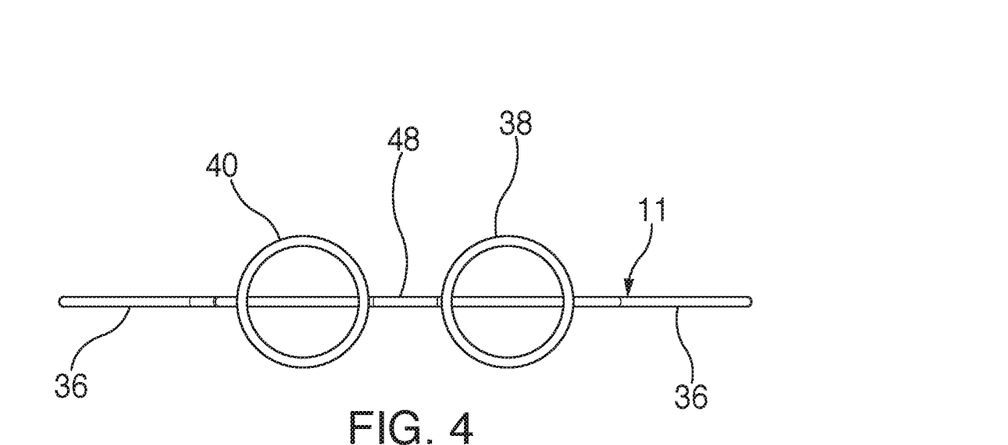
FIG. 4 is a front side elevational view of the O-ring shown in FIG. 3.
Figure 5:
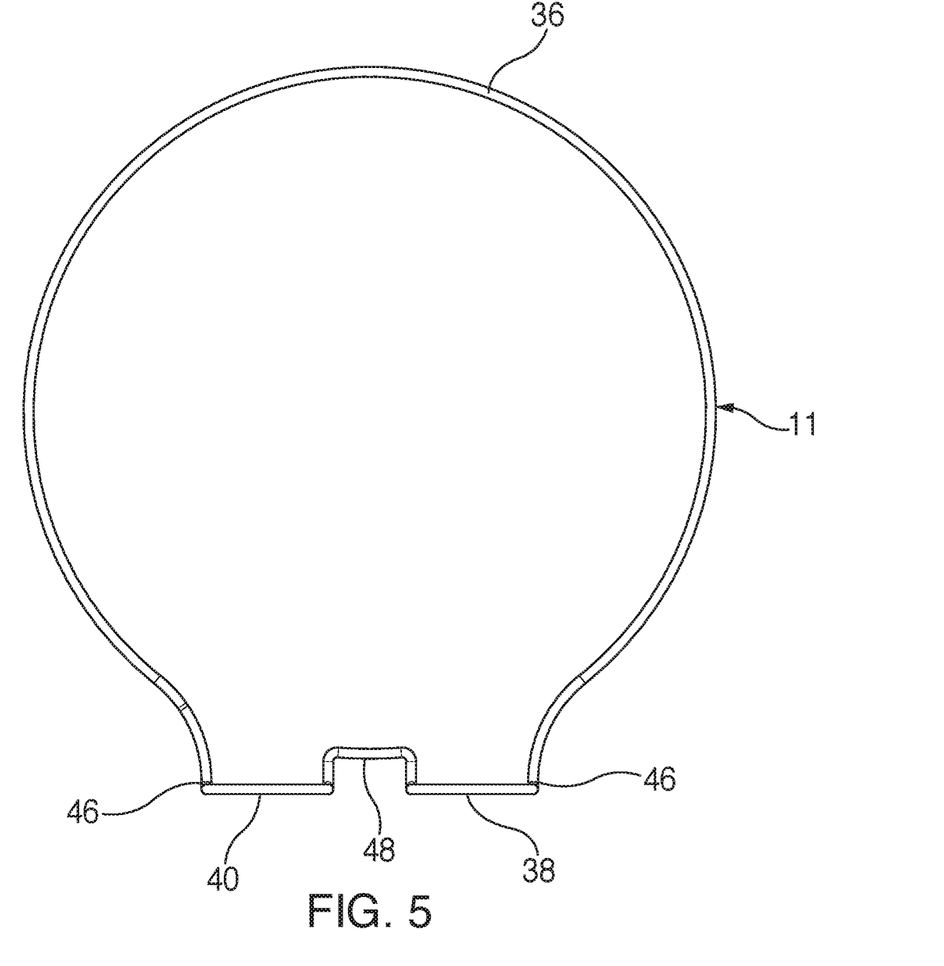
FIG. 5 is a plan view of the O-ring shown in FIG. 3.
Figure 6:
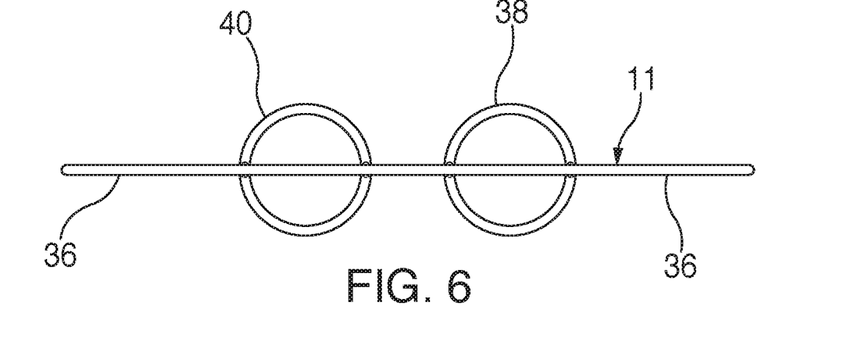
FIG. 6 is a rear side elevation view of the O-ring shown in FIG. 3.

As shown in FIGS. 4 and 6, both rings are symmetric relative to main ring 36, i.e., the plane of O-ring 36 intersects O-rings 38, 40 at their midpoints with the ends 46 of O-ring 36 attached to the outer edge of rings 38, 40 at their midpoint. The diameter of the smaller rings 38, 40 is also slightly smaller than the outside diameter of the pressure and vacuum ports 28, 30.

FIG. 2 also highlights the importance of the continuity of the shape of O-ring 11. The free ends 46 of the main ring 36 of O-ring 10 changes direction to join the two port rings 38, 40, with the ends 46 disposed at a 90-degree angle to the O-rings 38, 40 to allow sealing of the inner surfaces 62, 64 of the blower 10 adjacent ports 28, 30 which typically are joined to planar flanges having throughbores or ports of the system or installation (not shown) to which the vacuum and blower ports of the side channel blower are joined to provide vacuum or compression via said ports of the installation. The two smaller O-rings 38, 40 are joined together by a generally U-shaped bridge 48 at a midpoint of their inner sides. As seen in FIGS. 4 and 6, the U-shaped bridge lies in the same axial plane as main O-ring 36. The two ends 46 of the main ring 36, are each attached to a midpoint of the outer sides of one of the two port rings 38, 40 to allow the sealing of the surfaces of the casing elements 62, 64 which surrounds and extend between the two ports 28, 30.

As can be appreciated, the isolation or sealing of the inlet and outlet ports 28, 30 from the outside environment is provided by the two typically smaller eyeglass rim-shaped O-rings 38, 40. The small O-rings 38, 40 are each seated and mounted in a groove between the two casings 12, 16 and are disposed so that one O-ring 40 encircles the circumferences of the vacuum port and the other ring 38 encircles the circumferences of the pressure port.

Due to the geometry of O-ring 11, there is a continuous sealed circumference without any gaps. O-ring 11 follows the complete perimeter of the blower unit and meets with the connecting piping of the system (not shown) to which it is attached at its pressure and vacuum ports, 28, 30. This continuity allows for a complete coverage of the blower's joining surfaces. As described previously, O-ring 11 has a spectacle shape in the region of the two port rings 38, 40, although the three rings 36, 38, 40 are linked together. The bridge 48 between the two port rings 38, 40 allows for continuity of the seal. As a result of the two smaller rings' 38, 40 change of orientation by 90 degrees from the main ring 36 at the joint to which they are attached to ends 46, the planar face of the ports 28, 30 defines a joint plane by which the O-rings 38, 40 recessed in faces 62, 64 can seal the joint to the connecting planar faces of the flanges of the system to which the blower is attached (not shown) as further described below. This novel arrangement allows for the pressure and vacuum ports to be located parallel to the impeller's rotational plane and to seal the full perimeter of the unit using only one continuous O-ring.

Figure 3:
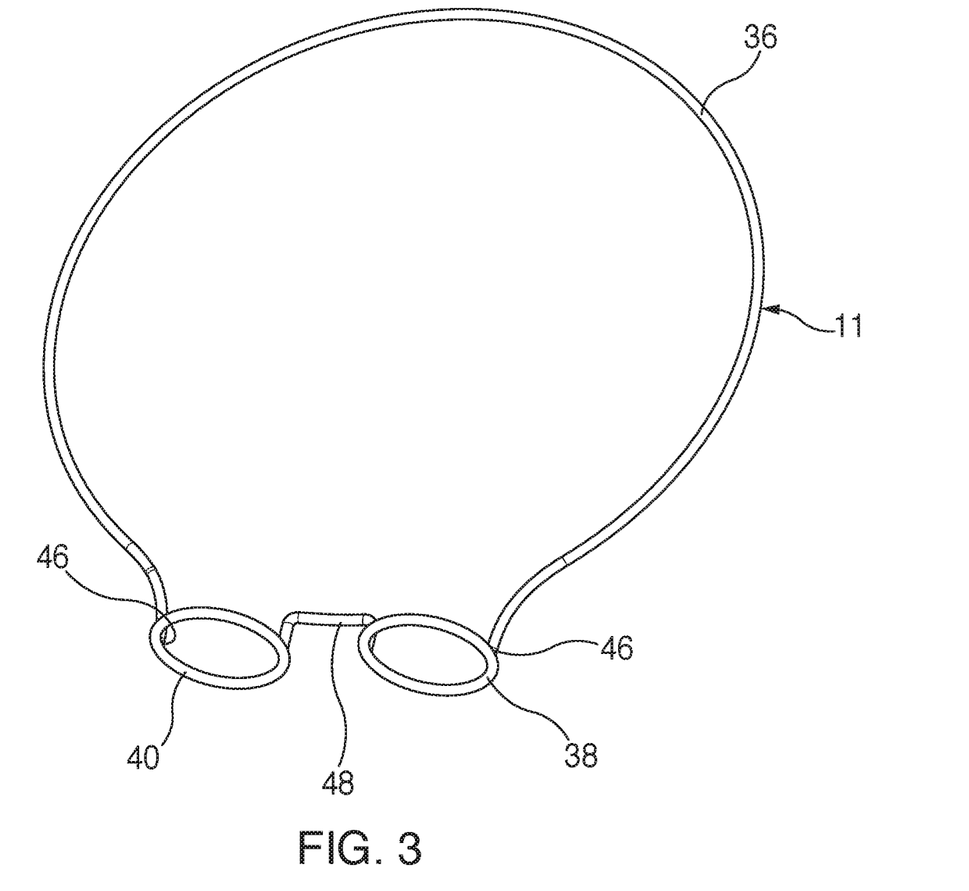
FIG. 3 is a top, front and side perspective view of the O-ring embodying the present invention in a free, unstressed state.

As seen best in FIG. 3, the arrangement of two smaller O-rings 38, 40, the bridge 48 and the ends 46 of the main O-ring create a unique, eyeglass frame or spectacle-like shape, i.e., the O-rings 38, 40 appearing as eyeglass rims or eyepieces, the bridge 48 creating the impression of the bridge of an eyeglass frame and the end portions 46 of the main O-ring 36 looking like the front portions of the temples or arms of a typical eyeglass frame. The bridge 48 lies in the same plane as main O-ring 36, but, the two small O-rings 38, 40 are each arranged in a plane disposed at an angle to the plane in which said main ring 36 and its free ends 46 are disposed which, together with said main ring ends 46, define a section of the thus formed unitary O-ring 11 having a generally spectacle-like shape. As a result of this configuration, a unitary O-ring is formed which provides a highly effective and continuous seal with no gaps.

Figure 9:
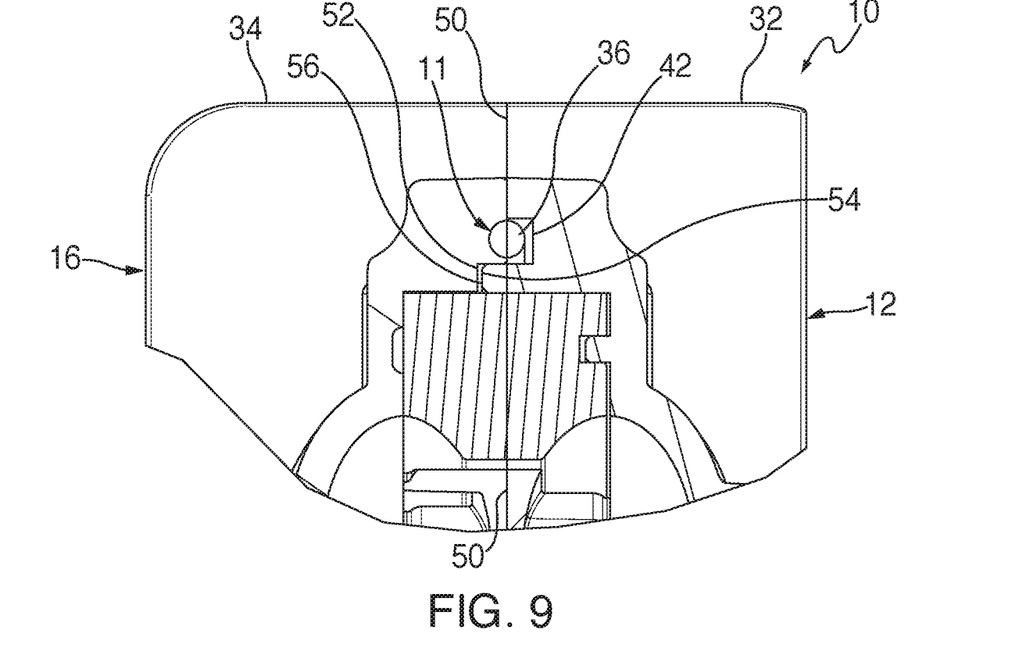
FIG. 9 is an enlarged, sectional view of the encircled detail A shown in FIG. 8, which illustrates the O-ring installed in a rectangular groove.
Figure 10:
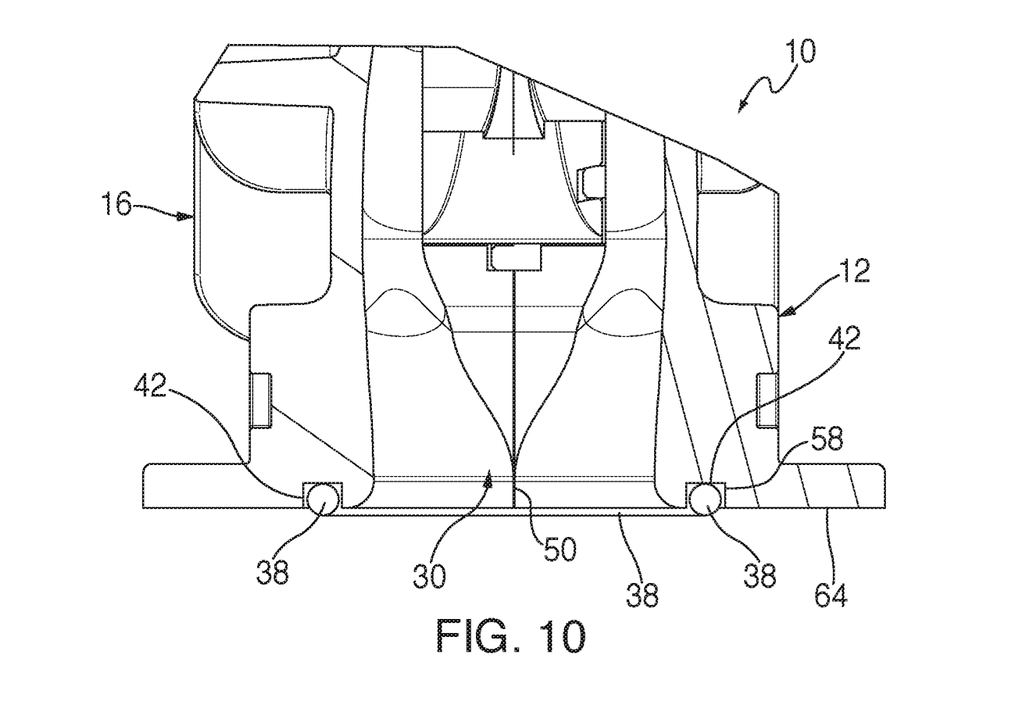
FIG. 10 is an enlarged, sectional view of the circled detail B shown in FIG. 8 which illustrates the O-ring installed in one of the rectangular grooves encircling one of the blower's side channel ports.

FIGS. 7-10 show details of the installation of the O-ring 11 on the different parts. FIG. 9 and FIG. 10 illustrate the encircled details A and B, respectively of FIG. 8, a sectional view taken along line 8-8 of FIG. 7 which runs through the pressure port 30. As shown therein, during installation, O-ring 11 can be placed in a restraining annular groove 42 which limits its axial movements and rolling. Typically, the groove 42 has a rectangular cross-sectional shape in order to capture the O-ring 11 and facilitate assembly. As the ring 11 is compressed, its circular cross section is flattened by the meeting of opposed surfaces of the outer casing parts 12, 16, deforming and thus reducing the inner-side diameter and increase the outer side diameter of the ring 11. Put simply, the O-ring is flattened to ensure its constant sealing contact with the confining, contacting, opposed blower surfaces to thereby seal the fluid path within the blower 10.

More particularly, the spectacle-shaped O-ring 11 is preferably installed in a rectangular cross-sectional groove 42 in the circumference of the motor side casing 12. As the casing is assembled, the other outer housing or casing 16, which does not have the machined groove, compresses the O-ring 11 in the groove 42 and its surface abuts and seals groove 42 within the motor side casing 12. There is thus no dislocation or gap possible, either radially or axially. Likewise, the pressure and vacuum port rings 38, 40 are aligned axially with the external system's or installation's connecting flanges and its intake and outtake ports (not shown) which compress the rings 38, 40 into sealing position within grooves 42 when the installation's flanges (not shown) are connected to the blower flanges 62, 64. The installation of the smaller two O-rings 38, 40 at the ports also restrict rotation of the main O-ring 36. Thus, along with sealing the pipe connection of the piping system of the installation (not shown) to the blower 10, they also restrict rotation of the O-ring 11 axially.

More particularly, as seen best in FIG. 9, O-ring 36 is seen in its free uncompressed form installed in a slightly larger groove 42 than its diameter which groove 42 is machined in the motor side casing 12. Outer casing 16 does not have a groove, thus compressing the O-ring 36 to a non-circular shape (not shown) and sealing the casings 12, 16 along their inner abutting faces at junction 50. The groove 42 extends radially along the circumference of the motor side casing 12 in between the channel 26 and the outside surface 34 as seen best in FIGS. 1-2. The two casing elements 12, 16 have mating surfaces 50, located adjacent outside edges 32, 34 of casings 12, 16, respectively which abut one another as the casings 12, 16 are compressed in a closed position. Radially-inward of groove 42, casings 16, 12 have surfaces 52, 54, respectively, which are separated by a gap 56 on the channel side of groove 42. This arrangement allows for only one surface, 50, to touch as the casings 12, 16 are closed. As the surfaces 50 meet, O-ring 11 is compressed and its circular cross section is deformed. The flattened O-ring 11 therefore provides a constant contact between the groove 42 and the casing 16.

Figures 7, 8:
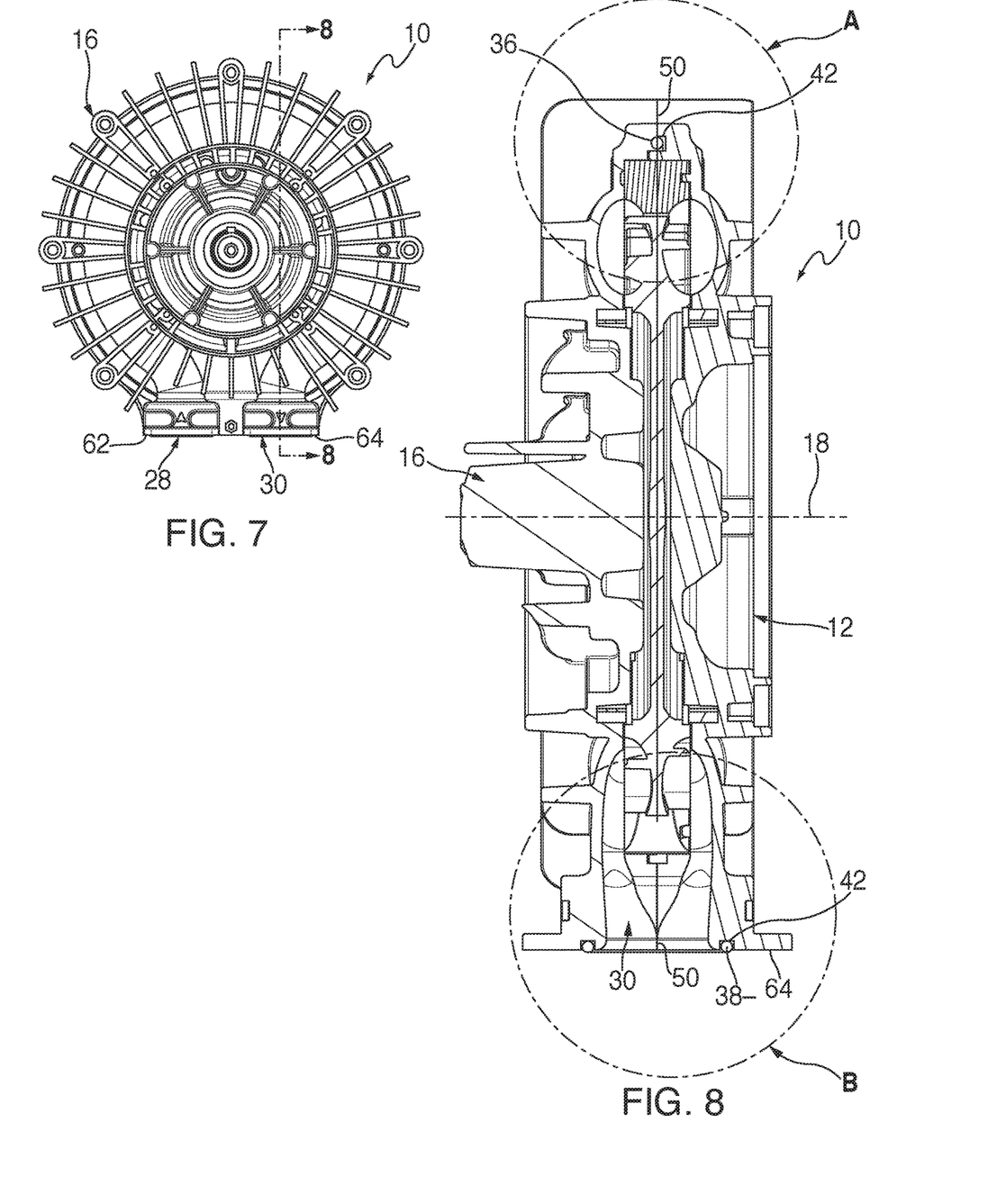
FIG. 7 is a plan view of the side channel blower embodying the present invention.
FIG. 8 is a sectional view of the side channel blower taken along line 8-8 of FIG. 7.

FIG. 10 illustrates an enlarged sectional view of detail B shown in FIG. 8 to better illustrate the installation of the port seals 38, 40. The depth and width of the rectangular grooves 42 at the pressure and vacuum ports 28, 30 are the same as the one around the motor side casing 12 described previously. The circular surface, of the O-ring 11 is compressed and flatten by the flanges (not shown), which attach the blower to the system or installation on which it operates, for instance, to provide compressed air and vacuum to, e.g., a dental chair. The surfaces of the flanges (not shown) do not have a groove for the O-ring 11 and meet and abut with the outside surfaces 62, 64 of the ports 28, 30. As the O-ring 11 is compressed, its surface creates an air-tight seal which prevents leakage of the blower's air outside of the system.

Consequently, the spectacle-shaped single or unitary O-ring 11 also ensures a permanent and adaptable seal during operation. As the blower changes temperature and undergoes heat induced deformations, the O-ring is subject to the same changes. Indeed, the O-ring 11 also expands under heat and provides a continuous and uniform sealing of the casing elements.

Moreover, the installation of the spectacle O-ring is not subject to tight tolerances or precision as the shape thereof is deformed by the casing elements themselves. Indeed, the required tolerances of the O-ring installation only rely on the dimensions of the machined groove in the casings which are dimensioned and configured for receipt of the O-ring 11 therein. The O-ring's orientation also follows the shape of the groove and placement of the ports of the side channel, thus self-adjusting into position during installation.

The design allows an easy assembly and low tolerances for the O-ring seals as they are installed in machined grooves in the inner casing element such that the outer casing element is fixed, and its inner surface compresses the O-ring inside the groove and allows for a uniform sealing contact. The design also provides a dynamic adaptation of the seal under temperature fluctuations, as the thermal deformations occur in the whole assembly and the seal maintains its integrity.

As noted above, the compressible O-ring is preferably made from rubber, synthetic rubber or an elastomer. Most desirably, it is made from FKM, a well-known synthetic rubber and fluoropolymer elastomer. Preferably, the main O-ring has an outer diameter in the range of about 200 to 300 mm, and the two smaller O-rings have a diameter in the range of about 30 to 50 mm.

While a particular embodiment of the invention has been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention. Accordingly, it is to be understood that the embodiments of the invention herein described are merely illustrative of the application of the principles of the invention.

We claim:

1. An O-ring for providing an air-tight seal of a blower impeller channel and side-by-side pressure and vacuum ports of a side channel blower, comprising:
    a circular, main O-ring for sealing a majority of the blower impeller channel, said main O-ring having two free ends, wherein said main O-ring lies in a first plane, wherein the majority of said main O-ring has an annular shape and wherein a minority thereof defined by said two free ends thereof extend outwardly from said majority of said main O-ring;
    two relatively smaller, spaced-apart, side-by-side, identically-sized port O-rings lying in a second plane so that they are disposed perpendicular to said main O-ring, said port O-rings each having a distal side and a proximal side relative to one another, wherein each of said port O-rings is attached to an opposite one of said free ends of said main O-ring at a midpoint of said respective distal sides thereof, and wherein said port O-rings are connected to one another at a midpoint of their respective proximal sides by a U-shaped O-ring bridge member lying in the same plane as said main O-ring, and wherein said port O-rings are configured and dimensioned so that one of said port O-rings serves to seal the vacuum port of the side channel blower and that the other of said port O-rings serves to seal the pressure port of the side channel blower, with said two port O-rings and O-ring bridge member and free ends of said main O-ring arranged and configured to simulate a spectacle-like shape with said two port O-rings simulating a pair of spaced-apart eyeglass rims of an eyeglass frame, with said U-shaped bridge member simulating a bridge of the eyeglass frame, and wherein the free ends of said main O-ring simulating a front end portion of a pair of temples of the eyeglass frame;
    wherein said O-ring is made of a deformable resilient material so that it can adapt to the shape of the surfaces which are to be sealed;
    wherein said resilient material is a member selected from the group consisting of rubber, synthetic rubber and an elastomer; and
    wherein said main O-ring and said two smaller port O-rings are formed as one single unitary O-ring.

2. The O-ring according to claim 1, wherein said member is FKM.

3. A side channel blower of the type comprising:
    a housing comprising at least two casing members which are joined together to define a circular impeller channel and two side-by-side vacuum and pressure ports;
    a rotatable impeller received in said circular impeller channel;
    a circular, main O-ring having two free ends for sealing a majority of the blower impeller channel, said main O-ring having two free ends, wherein said main O-ring lies in a first plane, wherein a majority of said main O-ring has an annular shape and a remainder thereof defined by said two free ends thereof extend outwardly from said majority of said main O-ring;
    two relatively smaller, side-by-side, identically-sized port O-rings lying in a second plane so that they are disposed perpendicular to said main O-ring, said port O-rings each having a distal side and a proximal side relative to one another, wherein each of said port O-rings is attached to an opposite one of said free ends of said main O-ring at a midpoint of said respective distal sides thereof, and wherein said port O-rings are connected to one another by a U-shaped O-ring bridge member lying in the same plane as said main O-ring at a midpoint of their respective proximal sides thereof and wherein said port O-rings are configured and dimensioned so that one of said port O-rings serves to seal the vacuum port of the side channel blower and that the other of said port O-rings serves to seal the pressure port of the side channel blower, with said two smaller port O-rings and O-ring bridge member and free ends of said main O-ring arranged and configured to simulate a spectacle-like shape with said two port O-rings simulating a pair of spaced-apart eyeglass rims of an eyeglass frame, with said U-shaped bridge member simulating a bridge of the eyeglass frame, and wherein the free ends of said main O-ring simulate a front end portion of a pair of temples of the eyeglass frame;

wherein said O-ring is made of a deformable resilient material so that it can adapt to the shape of the surfaces which are to be sealed;

wherein said resilient material is a member selected from the group consisting of rubber, synthetic rubber and an elastomer; and wherein said main O-ring and said two port O-rings are formed as one unitary piece.

4. The side channel blower according to claim 3, wherein said member is FKM.

* * * * *